(12) United States Patent
Eguchi

(10) Patent No.: US 10,351,464 B2
(45) Date of Patent: Jul. 16, 2019

(54) METHOD FOR MANUFACTURING GLASS, METHOD FOR MANUFACTURING LENS, AND MELTING APPARATUS

(71) Applicant: CANON KABUSHIKI KAISHA, Tokyo (JP)

(72) Inventor: Shingo Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 15/184,852

(22) Filed: Jun. 16, 2016

(65) Prior Publication Data

US 2016/0368811 A1 Dec. 22, 2016

(30) Foreign Application Priority Data

Jun. 22, 2015 (JP) .................................. 2015-125151

(51) Int. Cl.
*C03B 40/04* (2006.01)
*C03B 5/16* (2006.01)
*C03B 5/06* (2006.01)
*C03B 19/02* (2006.01)
*C03B 19/10* (2006.01)

(52) U.S. Cl.
CPC ................ *C03B 40/04* (2013.01); *C03B 5/06* (2013.01); *C03B 19/02* (2013.01); *C03B 19/1005* (2013.01); *C03B 19/1055* (2013.01)

(58) Field of Classification Search
CPC ...................................................... C03B 40/04
See application file for complete search history.

(56) References Cited

U.S. PATENT DOCUMENTS

| | | | | |
|---|---|---|---|---|
| 5,762,673 A | * | 6/1998 | Hirota | C03B 7/10 65/122 |
| 5,873,921 A | * | 2/1999 | Hirota | C03B 11/08 65/102 |
| 6,626,010 B1 | * | 9/2003 | Yoshida | C03B 7/12 65/127 |
| 2002/0194870 A1 | * | 12/2002 | Greulich-Hickmann | C03B 11/08 65/25.1 |
| 2003/0038386 A1 | * | 2/2003 | Parayre | C03B 40/04 261/122.1 |

(Continued)

FOREIGN PATENT DOCUMENTS

JP 2014-141389 A 8/2014

*Primary Examiner* — Jason L Lazorcik
(74) *Attorney, Agent, or Firm* — Canon U.S.A. Inc., IP Division

(57) ABSTRACT

A method for manufacturing glass, including the steps of heat-melting a raw material for producing glass by using a melting furnace having a plurality of gas flow paths while the raw material is levitated from the melting furnace by a gas ejected from the gas flow paths, and performing cooling so as to produce glass, wherein the melting furnace includes a recess portion, at least one first gas flow path configured to eject the gas in the vertical direction into the recess portion, a plurality of second gas flow paths configured to eject the gas in the direction toward the center axis of the melting furnace into the recess portion, the raw material is heat-melted while the raw material is levitated by the gas ejected from the first gas flow path and the gas ejected from the second gas flow paths, and the molten raw material is cooled.

9 Claims, 8 Drawing Sheets

(56) References Cited

U.S. PATENT DOCUMENTS

| | | | |
|---|---|---|---|
| 2005/0016215 A1* | 1/2005 | Greulich-Hickmann | C03B 35/24 65/182.2 |
| 2005/0092024 A1* | 5/2005 | Langsdorf | C03B 40/04 65/25.1 |
| 2006/0026993 A1* | 2/2006 | Schneider | C03B 7/12 65/25.1 |
| 2006/0205095 A1* | 9/2006 | Yono | C03B 5/06 438/2 |
| 2010/0003514 A1* | 1/2010 | Yono | C03B 19/1005 428/357 |
| 2013/0042649 A1* | 2/2013 | Isono | C03C 19/00 65/61 |
| 2014/0256531 A1* | 9/2014 | Endo | C03B 19/00 501/42 |
| 2015/0344349 A1* | 12/2015 | Sato | C03B 40/04 65/84 |
| 2017/0158549 A1* | 6/2017 | Yamada | C03B 32/00 |
| 2017/0190605 A1* | 7/2017 | Yamada | C03B 5/235 |
| 2017/0226002 A1* | 8/2017 | Suzuki | C03C 3/068 |
| 2018/0002220 A1* | 1/2018 | Suzuki | C03C 3/068 |
| 2018/0072605 A1* | 3/2018 | Sato | C03B 5/235 |
| 2018/0127301 A1* | 5/2018 | Sato | C03B 5/235 |

* cited by examiner

METHOD FOR MANUFACTURING GLASS, METHOD FOR MANUFACTURING LENS, AND MELTING APPARATUS

BACKGROUND OF THE INVENTION

Field of the Invention

Aspects of the present invention relate to a method for manufacturing a glass material by using a containerless melting method and a method for manufacturing a lens. In addition, aspects of the present invention relate to a melting apparatus.

Description of the Related Art

The containerless melting method is a manufacturing method in which a material is melted and solidified without using a container. With this method it is possible to avoid nucleation at a solid-liquid interface and thereby avoid part of the materials not being vitrified by a manufacturing method in which a container is used. Consequently, the containerless melting method is expected, as a method for manufacturing a glass material, to have heretofore unrealized new characteristics.

In the containerless melting method, a raw material is levitated and, thereby, has no contact with the surroundings. Examples of levitation methods include an electrostatic levitation system, an acoustic levitation system, an electromagnetic levitation system, and an aerodynamic levitation system. Among them, the aerodynamic levitation system is promising as a system capable of establishing the noncontact state in a relatively stable way without requiring complicated equipment.

The aerodynamic levitation system is a technique to levitate a material, which has been melted with a heating unit so as to become a viscous body, above a furnace by the force of a gas stream, and control of the levitation behavior of the material is an important issue. In particular, in the case where a large volume of glass is produced, the difficulty associated with the control increases. In order to deal with such an issue, Japanese Patent laid-Open No. 2014-141389 proposes a glass manufacturing method, in which a furnace having a plurality of gas ejection holes in the vertical direction is used, based on a containerless melting method.

However, according to the glass manufacturing method described in Japanese Patent laid-Open No. 2014-141389, as the volume of glass to be produced increases, contact between the levitated glass material and the furnace occurs easily.

SUMMARY OF THE INVENTION

A method for manufacturing glass, including the steps of heat-melting a raw material for producing glass by using a melting furnace having a plurality of gas flow paths while the raw material is levitated from the melting furnace by a gas ejected from the gas flow paths, and performing cooling so as to produce glass, wherein the melting furnace includes a recess portion, the melting furnace has at least one first gas flow path configured to eject the gas in the vertical direction into the recess portion, the melting furnace has a plurality of second gas flow paths configured to eject the gas in the direction toward the center axis of the melting furnace into the recess portion, the raw material is heat-melted while the raw material is levitated by the gas ejected from the first gas flow path of the melting furnace and the gas ejected from the second gas flow paths of the melting furnace, and the molten raw material is cooled so as to produce glass.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

The present invention will be described below in detail with reference to the drawings.

Melting Apparatus

Figure 1:
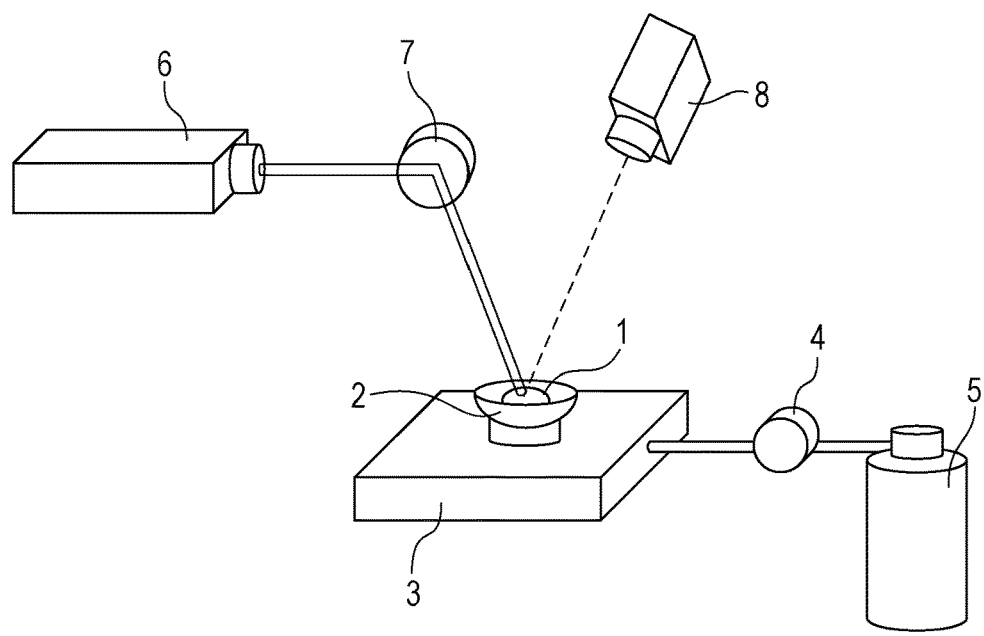
FIG. 1 is a schematic diagram of a production apparatus used in an embodiment.

FIG. 1 is a schematic diagram of a melting apparatus used in an embodiment according to the present invention. A melting apparatus 9 includes a melting furnace 2 configured to levitate a glass raw material and a stage 3 on which the melting furnace 2 is disposed. A gas is introduced into the stage 3 from a levitation gas supply source 5, e.g., a gas bomb, and the levitation gas is ejected from gas ejection holes disposed in the melting furnace 2. The flow rate of the levitation gas is controlled by a levitation gas flow rate controller 4 disposed in a gas pipe between the stage 3 and the levitation gas supply source 5. In addition, a melting unit 6 configured to melt the glass raw material block 1 placed on the melting furnace 2 is included and a camera 8 configured to observe the behavior of the raw material which is levitated from the melting furnace 2 and is melted.

In the present embodiment, a carbon dioxide gas laser is used as a heating unit 6, and the glass raw material block 1 is heated by being irradiated with laser light via a reflection mirror 7. The irradiation position is adjusted by the position, the angle, and the like of the reflection mirror 7. Radiant heating and the like may be used as heating means.

The melting apparatus is suitable for use as a glass production apparatus configured to produce glass.

Melting Furnace

Figure 2:
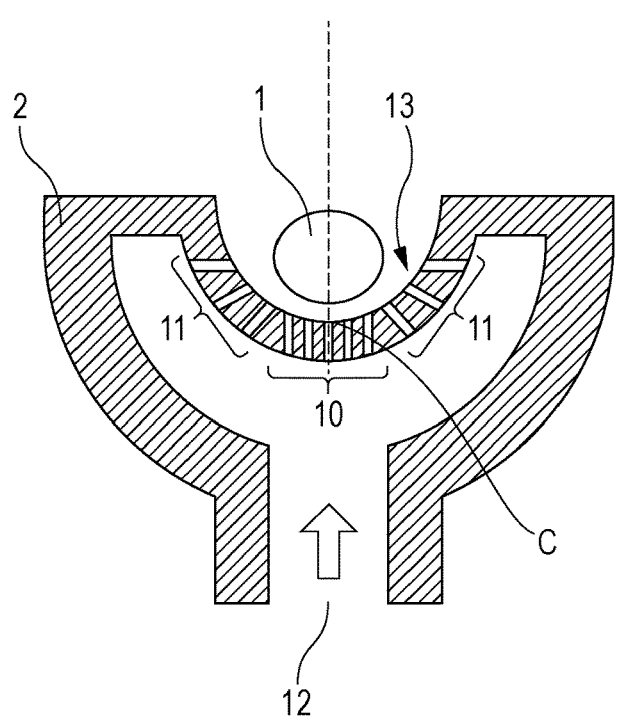
FIG. 2 is a sectional view of a melting furnace used in an embodiment.
Figure 3:
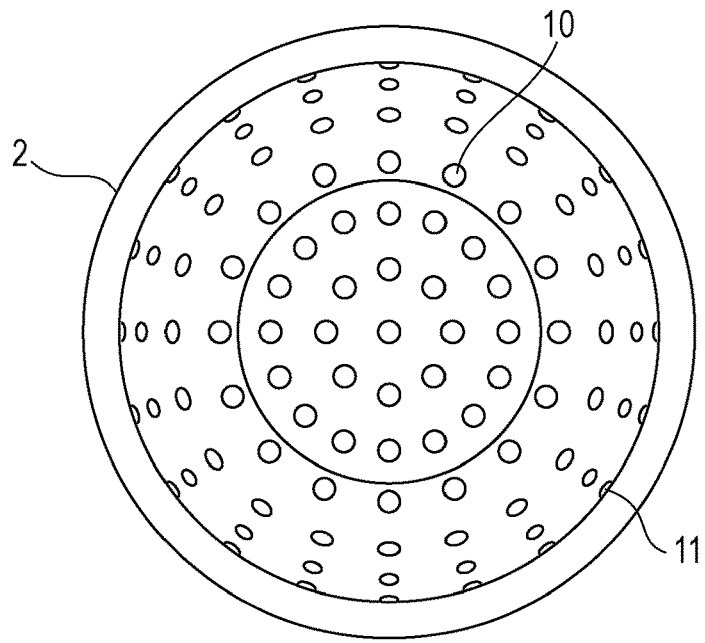
FIG. 3 is a plan view of a melting furnace used in an embodiment.

FIG. 2 and FIG. 3 are a sectional view and a plan view, respectively, of the melting furnace 2 used in an embodiment of the present invention. The material for the melting furnace 2 is not specifically limited as long as it is possible to endure the heat applied during melting of the glass raw material. For example, the melting furnace 2 can be produced from stainless steel, aluminum, carbon, silicon nitride, silicon carbide, aluminum nitride, or the like.

A recess portion 13 configured to accommodate the glass raw material block 1 is disposed in the center area of the melting furnace 2. The shape of the recess portion 13 is a concave shape such that the inner wall has a curvature, as shown in FIG. 2 and FIG. 3, and the curvature may be a single radius of curvature or a combination of a plurality of radii of curvature. In the recess portion 13, as shown in FIG. 2, at least one gas flow path (first gas flow path) 10 configured to eject a gas in the vertical direction is disposed in the center portion of the recess portion 13. The vertical direction includes not only the strictly vertical direction but also directions at an angle in the range of ±5 degrees with respect to the strictly vertical direction.

A plurality of gas flow paths (second gas flow paths) 11 configured to eject the gas in the direction toward the center axis (broken lines in FIG. 2) are disposed in the peripheral portion of the recess portion 13. The gas is introduced from the gas inlet 12 through the stage 3 in the direction indicated by an arrow shown in FIG. 2 and, thereby, the gas is ejected from the gas flow path 10 configured to eject the gas in the vertical direction and the gas flow paths 11 configured to eject the gas in the direction toward the center axis. The gas flow path 10 configured to eject the gas in the vertical direction and the gas flow paths 11 configured to eject the gas in the direction toward the center axis can be arranged symmetrically with respect to the center C of the melting furnace 2. The gas flow paths 11 configured to eject the gas in the direction toward the center axis can be disposed facing the center axis of the melting furnace 2.

In the case where the flow rates of the gas ejected from the first gas flow path and the second gas flow paths are controlled independently, it is necessary that the paths of the gas be separated by disposing a partition or the like in the melting furnace 2 and the levitation gas flow rate controller 4 be disposed in accordance with each path of gas. Each of the first gas flow path and the second gas flow path may be further separated into a plurality of routes and the resulting gas flow path groups may be controlled independently.

Method for Manufacturing Glass

In the present embodiment, a method for manufacturing a glass material having, for example, a small content of network former oxide and a composition that is not obtained as glass by a melting method using a container will be described. Examples include a boron-lanthanum-niobium based glass material having a composition in which the ratio of boron is 40 cat % or less.

The glass raw material block 1 is prepared by using a glass raw material powder mixed so as to have a predetermined composition. The form of the glass raw material block 1 may be a compact in which the raw material powder has been press-formed, a sintered body in which the raw material powder has been sintered, or a polycrystalline substance in which the raw material powder has been once melted by using laser irradiation or a melting furnace and has been crystallized.

The resulting glass raw material block 1 is placed in the recess portion 13 of the melting furnace 2. The levitation gas is ejected from the gas flow paths disposed in the melting furnace 2 at a predetermined flow rate by using the gas flow rate controller 4. The levitation gas is not specifically limited. The air, oxygen, or an inert gas, e.g., nitrogen, argon, or helium, can be used as the levitation gas.

After the levitation gas is ejected, the glass raw material block 1 is heat-melted by the heating unit 6. Here, any one of the ejection of the levitation gas and the heating of the glass raw material block 1 may be started earlier than the other or the two may be started at the same time. The flow rate of the ejected gas is adjusted by the levitation gas flow rate controller 4 such that the value of the flow rate becomes sufficient to release the glass raw material, which has been melted and made into the shape of a sphere or the shape of a go stone because of a surface tension, from the bottom surface of the melting furnace 2.

Figure 4:
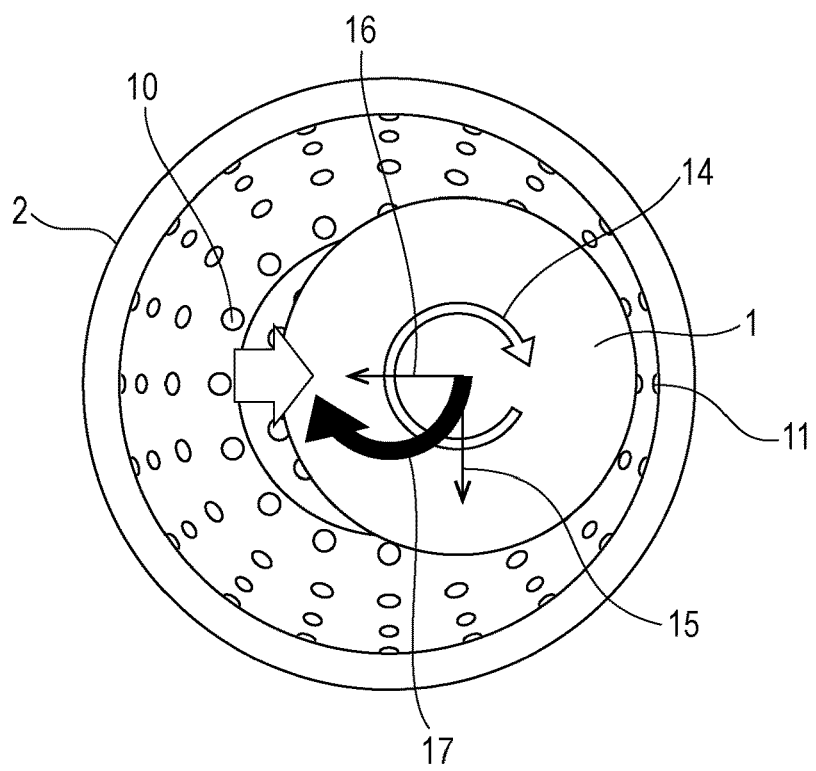
FIG. 4 is a schematic diagram showing a glass raw material block levitated in Example 1.

The levitation behavior of the glass raw material block in the present invention will be described below with reference to a schematic diagram illustrating the behavior of a glass raw material block levitated in an embodiment shown in FIG. 4. The glass raw material released from the bottom surface of the melting furnace by the gas stream in the vertical direction from the gas flow path 10 starts to rotate around the rotation axis in the vertical direction when a frictional force due to slight fluctuation of the gas is applied. Thereafter, a rotational air stream is caused by the rotation of the glass and, thereby, the rotation state is maintained.

If the gas stream around the glass melt becomes turbulent, the glass melt is displaced in the horizontal direction and approaches the inner wall of the melting furnace. In the case where the direction of the rotation is assumed to be the direction indicated by an arrow 14 at that time, the rotating glass melt is influenced by the gas stream coming from the inner wall, which the glass melt approaches, and receives a force in the direction indicated by an arrow 15 because of the Magnus effect. At the same time, on the side opposite to the inner wall, which the glass melt approaches, of the melting furnace, the pressure is reduced by the gas stream blown upward in the vertical direction, and a force for pushing back the glass melt toward the center of furnace, in the direction indicated by an arrow 16, is applied. These two forces are applied and, thereby, the glass raw material starts circular motion in the direction indicated by an arrow 17. At this time, a noncontact state is obtained because the distance between the glass melt and the furnace inner wall of the melting furnace is kept constant such that the centrifugal force by the circular motion matches the force for putting back to the center.

In order to keep a constant distance, it is necessary that each of the flow rate distribution of the gas from the gas flow path 10 configured to eject the gas in the vertical direction and the flow rate distribution of the gas from the gas flow paths 11 configured to eject the gas in the direction toward the center axis be symmetrical to some extent with respect to the center of the furnace.

In the method for manufacturing glass according to the present invention, the action of the gas from the gas flow path 10 in the vertical direction on the glass raw material is different from the action of the gas from the gas flow paths 11 in the direction toward the center axis. The following were found as a result of examinations of these levitation gas flow rates. If the flow rate of the gas from the gas flow path 10 in the vertical direction was too small, in some cases, the levitation force was insufficient and the glass raw material came into contact with the melting furnace bottom surface. If the flow rate was too large, fluctuation in the horizontal direction increased, and in some cases, the glass raw material came into contact with the melting furnace wall surface or the gas was entangled into the melted and softened glass raw material. If the flow rate of the gas from the gas flow paths 11 in the direction toward the center axis was too small, the glass raw material did not perform circular motion and came into contact with the melting furnace wall surface in some cases. If the flow rate was too large, in some cases, the gas was entangled into the melted and softened glass raw material in the same manner as the levitation gas stream in the vertical direction. As described above, the gas flow rate necessary for levitating the glass raw material stably of the gas stream in the vertical direction is different from that of the gas stream in the direction toward the center axis and each of the gas flow rates has to be adjusted in accordance with the properties and the size of the glass raw material and the shape of the melting furnace. Consequently, these flow paths can be controlled independently.

After the glass melt in the circular motion state is completely melted by heating with the heating unit, the heating is stopped and, thereby, a molten raw material is solidified so as to obtain glass. In the initial stage of the heating, an unmelted portion is present in the glass raw material. Therefore, even when the circular motion is started, heating has to be continued until the melting is completed. Consequently, in the case where heat-melting is performed by using the laser, the irradiation position of the laser has to be on a trajectory of the circular motion of the glass melt.

Method for Manufacturing Lens

A lens is produced by forming the glass obtained in the above-described method for manufacturing glass by a known forming method, e.g., glass furnace forming.

The present invention will be described below in detail with reference to specific examples.

EXAMPLES

Example 1

In Example 1, a raw material was prepared by weighing and mixing oxide raw materials such that the ratio of constituent cationic components became 30 cat % of $B^{3+}$, 60 cat % of $La^{3+}$, 5 cat % of $Nb^{5+}$, and 5 cat % of $Ti^{4+}$. The resulting raw material powder was formed into the shape of a bar by CIP forming, and the compact was heat-treated at 1,400° C. The resulting compact was cut so as to obtain a glass raw material block having a mass of 0.4 g.

The resulting glass raw material block 1 was melted by the melting apparatus, as shown in FIG. 1. Two 100-W carbon dioxide gas lasers were used as the heating unit 6. The lasers were adjusted such that the center of the furnace was irradiated by using the reflection mirror 7. The melting furnace 2 was composed of aluminum and had the recess portion 13 configured to accommodate the glass raw material block 1.

Figure 5A:
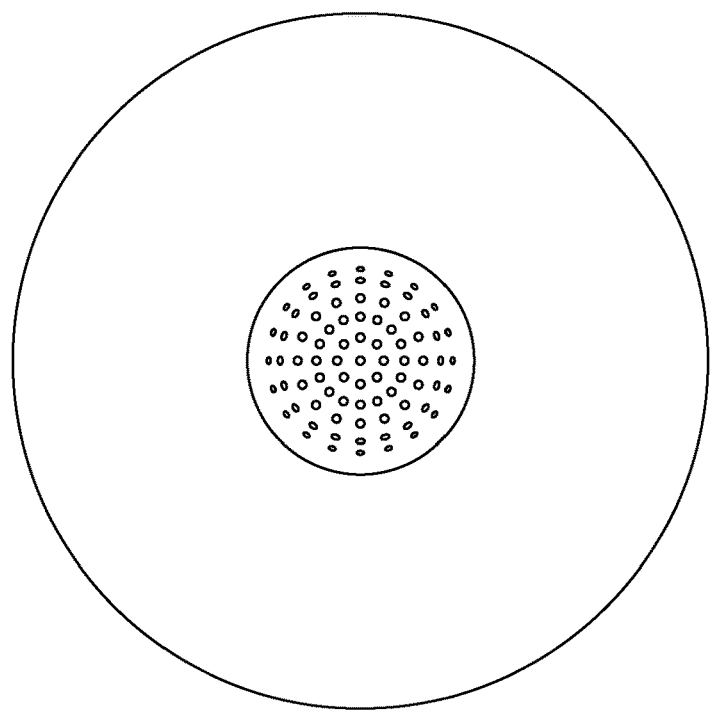
FIGS. 5A and 5B are diagrams showing a melting furnace used in Example 1.
Figure 5B:
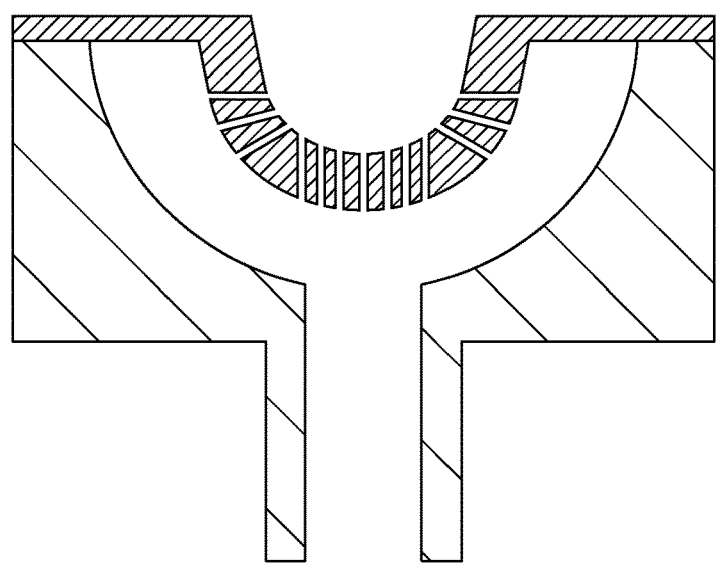

The shape of the melting furnace 2 used in Example 1 is shown in FIGS. 5A and 5B. FIG. 5A is a plan view of the melting furnace 2 viewed from above. FIG. 5B is a sectional view of the melting furnace 2 viewed from the side. The recess portion 13 was curved such that the bottom surface had a radius of 5.6 mm and the outer perimeter area had a radius of 3.0 mm, and the inner diameter was 8 mm. In the recess portion 13, the gas flow paths (first gas flow paths) 10 configured to eject the gas in the vertical direction and the gas flow paths (second gas flow paths) 11 configured to eject the gas in the direction toward the center axis were disposed. Each gas flow path had a diameter of 0.3 mm. The number of paths in the vertical direction was 41 and the number of paths disposed in the wall surface was 60. Regarding the gas flow paths (first gas flow paths) 10 configured to eject the gas in the vertical direction, 1 path was disposed at the center of the furnace, 8 paths were disposed equidistantly on the circumference of a circle centering on the furnace center and having a diameter of 2 mm, 16 paths were disposed equidistantly on the circumference of a circle centering on the furnace center and having a diameter of 3.5 mm, and 16 paths were disposed equidistantly on the circumference of a circle centering on the furnace center and having a diameter of 5 mm. Regarding the gas flow paths (second gas flow paths) 11 configured to eject the gas in the direction toward the center axis, 20 paths were disposed equidistantly on the circumference of each of circles centering on the center axis of the furnace and being positioned at the heights of 1.1 mm, 1.8 mm, and 2.5 mm from the center of the furnace bottom surface, where the paths were arranged in the directions at angles of 60 degrees, 75 degrees, and 90 degrees, respectively, with respect to the center axis of the furnace.

The glass raw material block 1 was placed substantially at the center of the accommodation portion of the melting furnace 2, oxygen was introduced at a flow rate of 3.0 l/min from the levitation gas inlet 12, and oxygen was ejected from each of the ejection holes. Subsequently, the glass raw material block 1 was heat-melted by a carbon dioxide gas laser. As melting proceeds, the glass raw material block 1 was made to have a nearly spherical shape because of a surface tension and, in addition, was levitated by the gas ejected from the bottom surface. The glass raw material block 1 was brought into a circular motion state shortly after levitation. Heating was continued for 15 seconds and, thereafter, laser was stopped, and cooling was performed. As a result, glass having a diameter of 5.4 mm was obtained.

The same amount of glass raw material block 1 was used and the same process was performed ten times. As a result, in nine cases, cooling was able to be performed without contact between the raw material melt and the furnace, and glass was obtained in the same manner. However, in one case, the melt came into contact with the furnace during rotation and circular motion so as to cause crystallization.

Example 2

Figure 6A:
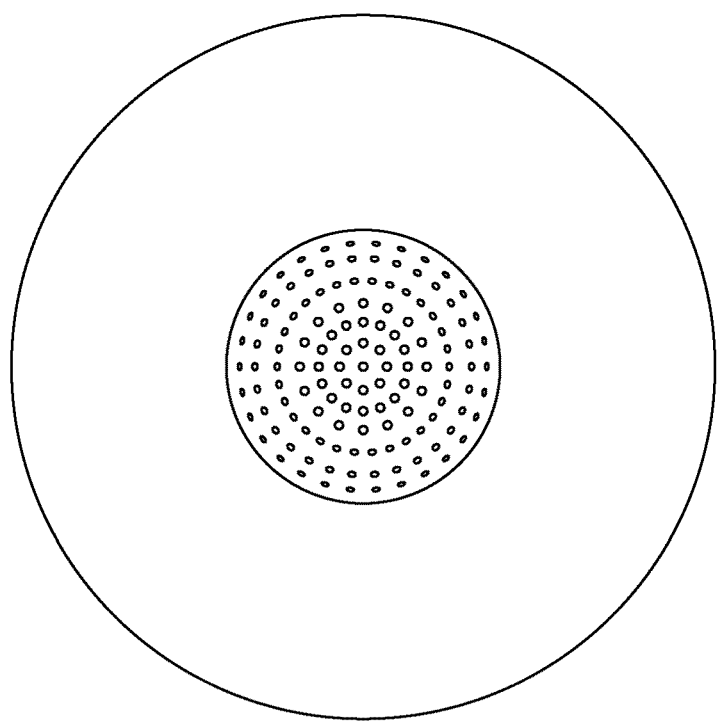
FIGS. 6A and 6B are diagrams showing a melting furnace used in Example 2.
Figure 6B:
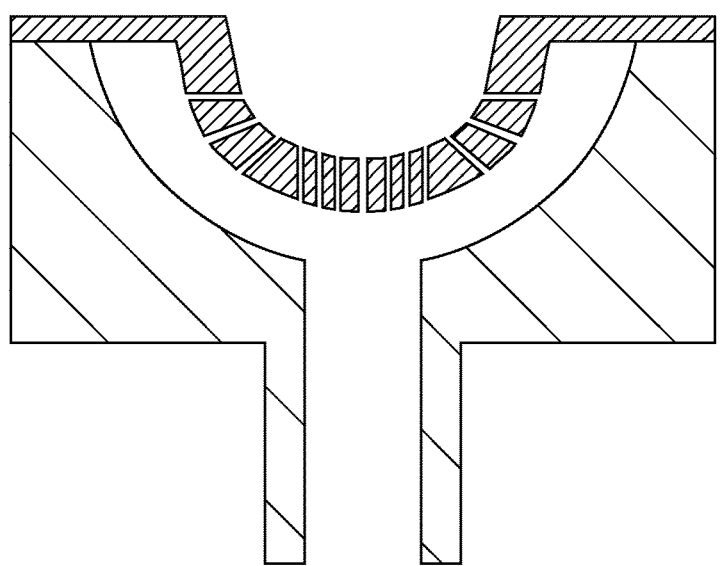

Glass was produced by using the same glass raw material block 1 and melting apparatus 9 as those in Example 1. The glass raw material block 1 was adjusted to have a mass of 0.47 g. The melting furnace 2 was composed of aluminum as with Example 1. The recess portion 13 was curved such that the bottom surface had a radius of 6.6 mm and the outer perimeter area had a radius of 3.0 mm, and the inner diameter was 10 mm. The shape of the melting furnace 2 used in Example 2 is shown in FIGS. 6A and 6B. FIG. 6A is a plan view of the melting furnace 2 viewed from above. FIG. 6B is a sectional view of the melting furnace 2 viewed from the side. In the recess portion 13, the gas flow paths in the vertical direction and the direction toward the center were disposed as in Example 1. Each gas flow path had a diameter of 0.3 mm. The number of gas flow paths 10 disposed so as to eject the gas in the vertical direction was 41 and the number of gas flow paths 11 disposed so as to eject the gas in the direction toward the center axis was 90. Regarding the gas flow paths 10 configured to eject the gas in the vertical direction, 1 path was disposed at the center of the furnace, 8 paths were disposed equidistantly on the circumference of a circle centering on the furnace center and having a diameter of 2 mm, 16 paths were disposed equidistantly on the circumference of a circle centering on the furnace center and having a diameter of 3.5 mm, and 16 paths were disposed equidistantly on the circumference of a circle centering on the furnace center and having a diameter of 5 mm. Regarding the gas flow paths 11 configured to eject the gas in the direction toward the center axis, 30 paths were disposed equidistantly on the circumference of each of circles centering on the center axis of the furnace and being positioned at the heights of 0.9 mm, 1.6 mm, and 2.5 mm from the center of the furnace bottom surface, where the paths were arranged in the directions at angles of 49 degrees, 69 degrees, and 90 degrees, respectively, with respect to the center axis of the furnace.

The glass raw material block 1 was placed substantially at the center of the recess portion 13 of the melting furnace 2, oxygen was introduced at a flow rate of 8.0 l/min from the levitation gas inlet 12, and oxygen was ejected from each of the flow paths. Subsequently, the glass raw material block 1 was heat-melted by a carbon dioxide gas laser. As melting proceeds, the glass raw material block 1 was made to have a nearly spherical shape because of a surface tension and, in addition, was levitated by the gas ejected from the bottom surface. The glass raw material block 1 was brought into a rotation and circular motion state shortly after levitation. Heating was continued for 15 seconds and, thereafter, laser was stopped, and cooling was performed. As a result, glass having a diameter of 5.6 mm was obtained.

The same amount of glass raw material block 1 was used and the same process was performed ten times. As a result, in eight cases, cooling was able to be performed without contact between the raw material melt and the furnace, and glass was obtained in the same manner. However, in two cases, the melt came into contact with the furnace during rotation and circular motion so as to cause crystallization.

Example 3

Figure 9:
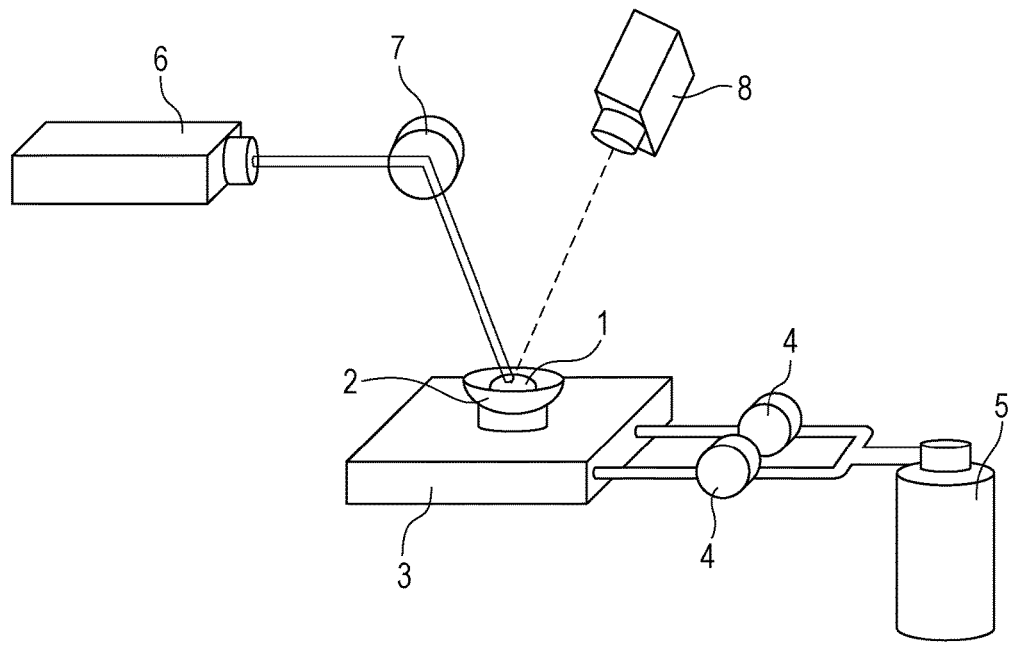
FIG. 9 is a schematic diagram of a production apparatus used in Example 3.
Figure 10:
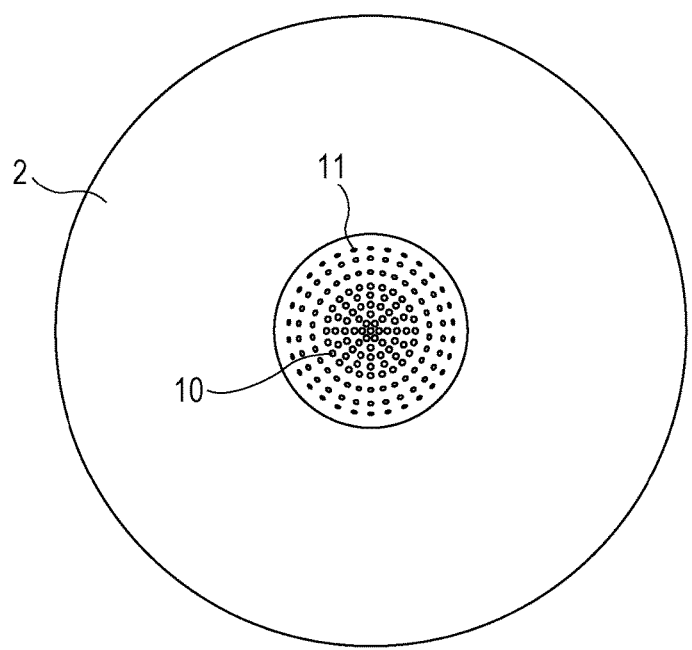
FIG. 10 is a plan view of a melting furnace used in Example 3.
Figure 11:
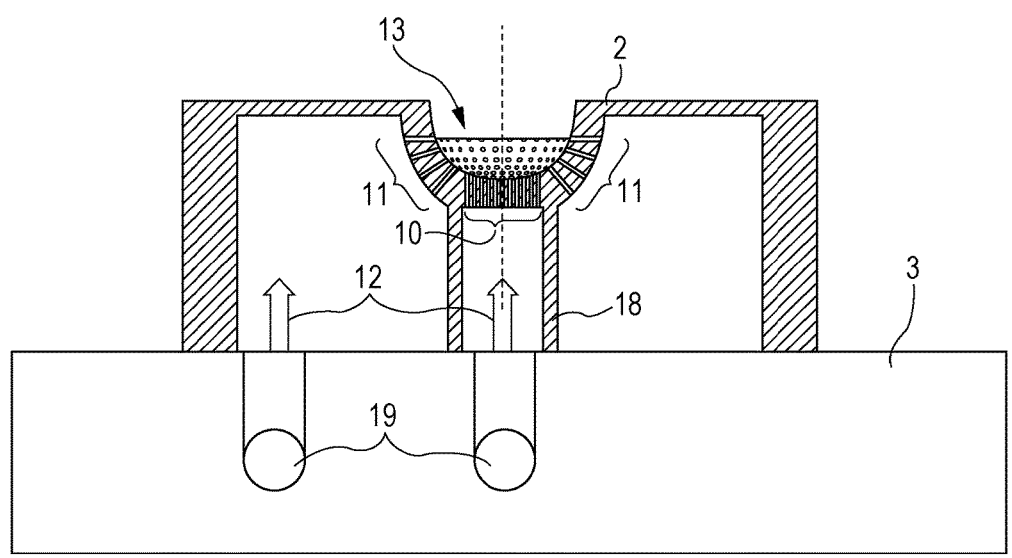
FIG. 11 is a sectional view of a melting furnace used in Example 3.

Glass was produced by using the same glass raw material block 1 as that in Example 1. The glass raw material block 1 was adjusted to have a mass of 0.66 g. The glass raw material block 1 was melted by a melting furnace shown in FIG. 9. One 200-W carbon dioxide gas laser was used as the heating unit 6. The laser was adjusted such that the center of the furnace was irradiated by using the reflection mirror 7. The shape of the melting furnace 2 used in Example 3 is shown in FIG. 10 and FIG. 11. FIG. 10 is a plan view of the melting furnace 2 viewed from above. FIG. 11 is a sectional view of the melting furnace 2 viewed from the side. The melting furnace 2 was composed of aluminum as with Example 1. The recess portion 13 was curved such that the bottom surface had a radius of 6.6 mm and the outer perimeter area had a radius of 3.0 mm, and the inner diameter was 10 mm. In the recess portion 13, the gas flow paths (first gas flow paths) 10 configured to eject the gas in the vertical direction and the gas flow paths (second gas flow paths) 11 configured to eject the gas in the direction toward the center axis were disposed as in Example 1. Each gas flow path had a diameter of 0.3 mm. The number of first gas flow paths 10 disposed was 71 and the number of second gas flow paths 11 disposed was 120. Regarding the gas flow paths 10, 1 path was disposed at the center of the furnace, 6 paths were disposed equidistantly on the circumference of a circle centering on the furnace center and having a diameter of 1 mm, and likewise 8 paths, 16 paths, 16 paths, and 24 paths were disposed equidistantly on the circumference of circles having diameters of 2 mm, 3 mm, 4 mm, and 5 mm, respectively. Regarding the second gas flow paths 11, 30 paths were disposed equidistantly on the circumference of each of circles centering on the center axis of the melting furnace and being positioned at the heights of 0.9 mm, 1.4 mm, 2.2 mm, and 3.0 mm from the center of the furnace bottom surface, where the paths were arranged in the directions at angles of 42.5 degrees, 58.2 degrees, 75.6 degrees, and 90 degrees, respectively, with respect to the center axis of the furnace. As shown in FIG. 11, a partition 18 configured to separate the first gas flow paths from the second gas flow paths was disposed in the melting furnace 2 and the levitation gas was introduced through two levitation gas introduction paths 19 disposed in the stage 3. The flow rates of the levitation gas passing the individual flow paths were controlled independently by two mass flow controllers used as the flow rate controllers 4.

The glass raw material block 1 was placed substantially at the center of the recess portion 13 of the melting furnace 2, oxygen was introduced into the first gas flow paths at a flow rate of 2.0 l/min and into the second gas flow paths at a flow rate of 4.0 l/min, and oxygen was ejected from each of the flow paths. Subsequently, the glass raw material block 1 was heat-melted by a carbon dioxide gas laser. As melting proceeds, the glass raw material block 1 was made to have a nearly spherical shape because of a surface tension and, in addition, was levitated by the gas ejected from the bottom surface. The glass raw material block 1 was brought into a rotation and circular motion state shortly after levitation. Heating was continued for 15 seconds and, thereafter, laser was stopped, and cooling was performed. As a result, glass having a diameter of 6.7 mm was obtained.

The same amount of glass raw material block 1 was used and the same process was performed ten times. As a result, in nine cases, cooling was able to be performed without contact between the raw material melt and the furnace, and glass was obtained in the same manner. However, in one case, the melt came into contact with the furnace during rotary and revolutionary levitation so as to cause crystallization.

Comparative Example 1

Figure 7A:
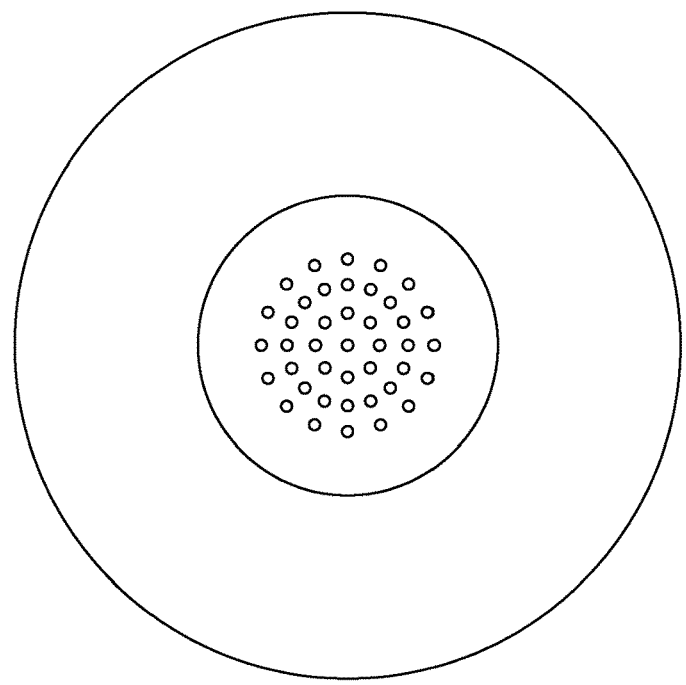
FIGS. 7A and 7B are diagrams showing a melting furnace used in Comparative example 1.
Figure 7B:
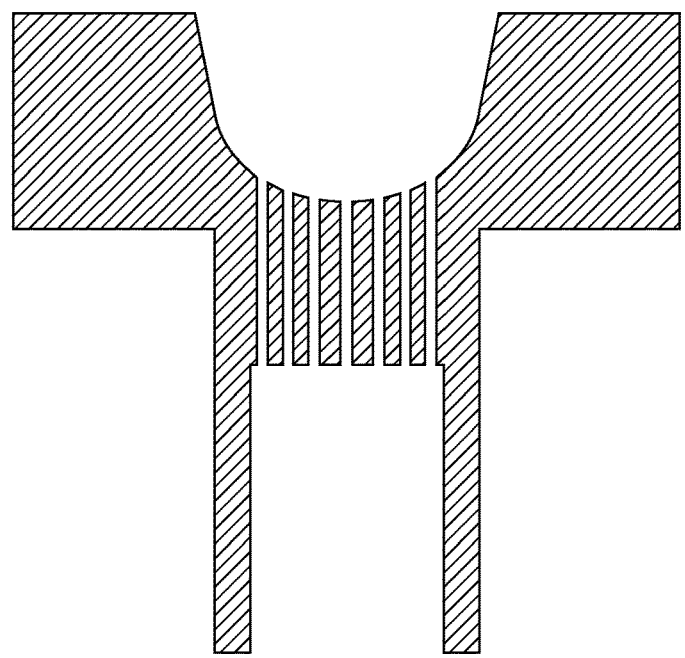

Glass was produced by using the same glass raw material block 1 and melting apparatus as those in Example 1. The glass raw material block 1 was adjusted to have a mass of 0.38 g. Regarding the melting furnace 2 used, the material, the shape of the recess portion 13, the diameter of the flow path, and the arrangement of the gas flow paths 10 in the vertical direction were the same as those of the melting furnace 2 used in Example 1, but the gas flow paths 11 in the direction toward the center were not included. The shape of the melting furnace 2 used in Comparative example 1 is shown in FIGS. 7A and 7B. FIG. 7A is a plan view of the melting furnace 2 viewed from above. FIG. 7B is a sectional view of the melting furnace 2 viewed from the side.

The glass raw material block 1 was placed substantially at the center of the recess portion 13 of the melting furnace 2, oxygen was introduced at a flow rate of 1.9 l/min from the levitation gas inlet 12, and oxygen was ejected from each of the flow paths. Subsequently, the glass raw material block 1 was heat-melted by a carbon dioxide gas laser. As melting proceeds, the glass raw material block 1 was made to have a nearly spherical shape because of a surface tension and, in addition, was levitated by the gas ejected from the bottom surface. The levitated glass melt maintained a state of being in no contact with the furnace for about 5 seconds although small vibration occurred. Then, the glass melt fluctuated to a great extent so as to come into contact with the furnace. The melt in contact with the furnace did not come off the furnace thereafter and was made into a crystal when the laser was stopped. The diameter of the crystal was 5.3 mm.

The same amount of raw material block was used and the same process was performed ten times. As a result, in all ten cases, the glass raw material 1 came into contact with the melting furnace and glass was not able to be obtained.

Comparative Example 2

Glass was produced by using the same glass raw material block 1 and melting apparatus as those in Example 1. The glass raw material block 1 was adjusted to have a mass of 0.40 g. Regarding the melting furnace 2 used, the material, the shape of the recess portion 13, and the diameter of the flow path were the same as those of the melting furnace 2 used in Example 1.

Figure 8A:
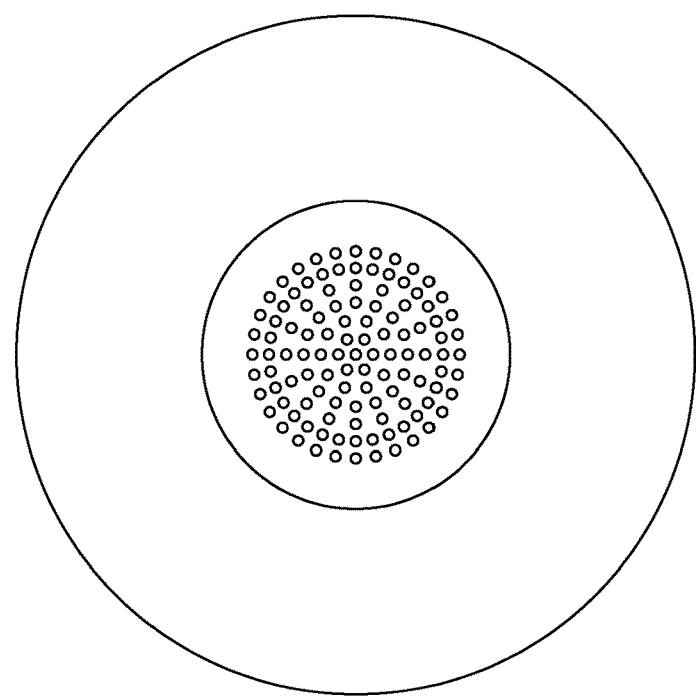
FIGS. 8A and 8B are diagrams showing a melting furnace used in Comparative example 2.
Figure 8B:
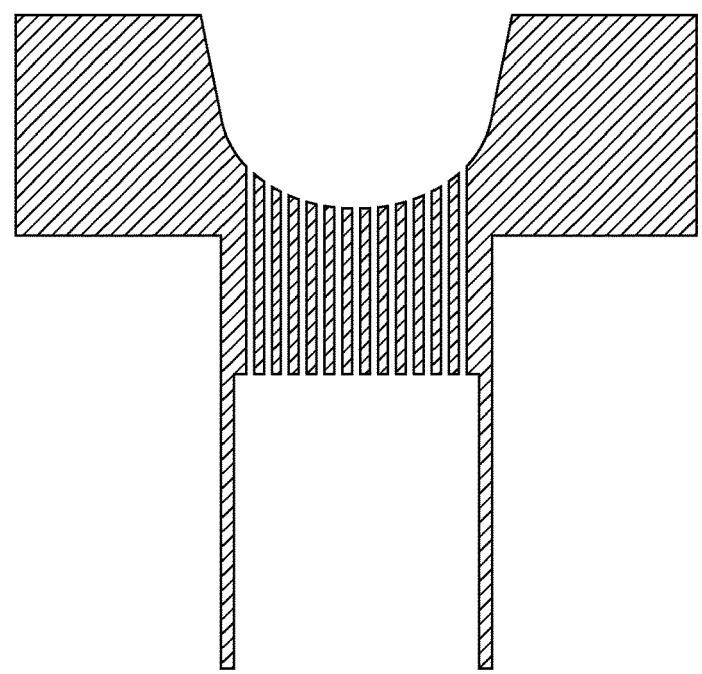

The shape of the melting furnace 2 used in Comparative example 2 is shown in FIGS. 8A and 8B. FIG. 8A is a plan view of the melting furnace 2 viewed from above. FIG. 8B is a sectional view of the melting furnace 2 viewed from the side. In the recess portion 13, the number of gas flow paths 10 in the vertical direction was 113 and the gas flow path 11 in the direction toward the center was not disposed. Regarding the gas flow paths 10 in the vertical direction, 1 path was disposed at the center of the furnace. In addition, 6 paths were disposed equidistantly on the circumference of a circle centering on the furnace center and having a diameter of 1 mm, 10 paths were disposed equidistantly on the circumference of a circle having a diameter of 2 mm, likewise 16 paths and 16 paths were disposed equidistantly on the circumferences of circles having diameters of 3 mm and 4 mm, respectively, and likewise 32 paths and 32 paths were disposed equidistantly on the circumferences of circles having diameters of 5 mm and 6 mm, respectively.

The glass raw material block 1 was placed substantially at the center of the recess portion 13 of the melting furnace 2, oxygen was introduced at a flow rate of 4.0 l/min from the levitation gas inlet 12, and oxygen was ejected from each of the flow paths. Subsequently, the glass raw material block 1 was heat-melted by a carbon dioxide gas laser. As melting proceeds, the glass raw material block 1 was made to have a nearly spherical shape because of a surface tension and, in addition, was levitated by the gas ejected from the bottom surface. The levitated glass melt maintained a state of being in no contact with the furnace for about 5 seconds although small vibration occurred. Then, the glass melt fluctuated to a great extent so as to come into contact with the furnace. The glass raw material 1 did not come off the furnace thereafter and was made into a crystal when the laser was stopped. The diameter of the crystal was 5.4 mm.

The same amount of raw material block 1 was used and the same process was performed ten times. As a result, in all ten cases, the glass raw material 1 came into contact with the melting furnace and glass was not able to be obtained.

Evaluation

In Examples 1 and 2, glass having a diameter of 5.0 mm was able to be produced with a high probability by producing the glass on the basis of the containerless melting method using the melting furnace 2 having a plurality of gas flow paths 10 in the vertical direction and a plurality of gas flow paths 11 in the direction toward the center axis. It was found that the glass was obtained with a high probability when the angle formed by the second gas flow paths in the direction toward the center axis with the center axis of the melting furnace 2 was 45° or more and 90° or less. Also, it was found that large glass was able to be produced by controlling the flow rate of the gas ejected from the gas flow paths in the vertical direction and the flow rate of the gas ejected from the gas flow paths in the direction toward the center axis independently.

In Comparative examples 1 and 2, it was found that when the melting furnace 2 having only a plurality of gas flow paths 10 in the vertical direction and not having the gas flow path 11 in the direction toward the center axis was used, the glass raw material 1 came into contact with the melting furnace 2 easily and production of glass having a diameter of 5.0 mm or more was difficult.

According to the present invention, in the case where a large volume glass material having a diameter of more than 5 mm is produced on the basis of the containerless melting method, frequency of contact between the levitated molten glass raw material and the furnace is reduced. That is, a glass material having a composition which is obtained through vitrification by only a noncontact melting method, e.g., a containerless melting method, and having a large diameter is produced with a high probability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-125151, filed Jun. 22, 2015, which is hereby incorporated by reference herein in its entirety.

What is claimed is:

1. A method for manufacturing glass, comprising the steps of:
    heat-melting a raw material for producing glass by using a melting furnace having a plurality of gas flow paths while the raw material is levitated from the melting furnace by a gas ejected from the gas flow paths; and
    performing cooling so as to produce glass,
    wherein the melting furnace includes a recess portion,
    the melting furnace has at least one first gas flow path configured to eject the gas in the vertical direction into the recess portion,
    the melting furnace has a plurality of second gas flow paths configured to eject the gas in the direction toward the center axis of the melting furnace into the recess portion,
    wherein the plurality of second gas flow paths are disposed on the circumference of a plurality of circles centering on the center axis extending in the vertical direction of the furnace, the circles being positioned at a plurality of heights from the center of the recess portion,
    the raw material is heat-melted while the raw material is levitated by the gas ejected from the first gas flow path of the melting furnace and the gas ejected from the second gas flow paths of the melting furnace, so as to produce and maintain an orbital motion, of the raw material, about the center axis of the furnace as processing proceeds, and
    the molten raw material is cooled so as to produce glass.

2. The method for manufacturing glass, according to claim 1,
    wherein the raw material is heat-melted while the raw material is levitated from the melting furnace and is in rotational and orbital motion when viewed from above.

3. The method for manufacturing glass, according to claim 1,
    wherein the second gas flow paths are disposed facing the center axis of the melting furnace.

4. The method for manufacturing glass, according to claim 1, wherein the second gas flow paths facing the center axis of the melting furnace form an angle, equal to or greater than 45° and equal to or less than 90°, with the center axis of the melting furnace.

5. The method for manufacturing glass, according to claim 1,
wherein the flow rate of the gas ejected from the first gas flow path and the flow rate of the gas ejected from the second gas flow paths are controlled independently.

6. The method for manufacturing glass, according to claim 1,
wherein the flow rate of the ejected gas, from the plurality of second gas flow paths, is set according to at least one of a weight of the raw material and a diameter of the recess portion.

7. A method for manufacturing glass, comprising the steps of:
heat-melting a raw material for producing glass by using a melting furnace having a plurality of gas flow paths while the raw material is levitated from the melting furnace by a gas ejected from the gas flow paths and is in rotational and circular orbital motion when viewed from above; and
cooling the molten raw material so as to produce glass.

8. The method for manufacturing glass, according to claim 7,
wherein the glass produced has a diameter greater than or equal to 5 mm.

9. A method for manufacturing a lens, comprising the steps of:
producing glass by the manufacturing method according to claim 1; and
forming the glass so as to produce a lens.

* * * * *